US009108531B2

(12) United States Patent
Marois et al.

(10) Patent No.: US 9,108,531 B2
(45) Date of Patent: Aug. 18, 2015

(54) VEHICLE FOOT BOARD AND PEDAL ASSEMBLY

(75) Inventors: Dany Marois, Sherbrooke (CA);
Yannick Bourque, Saint-Denis-de-Brompton (CA); Bruno Girouard, Shefford (CA); Bruno Bedard, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 27 days.

(21) Appl. No.: 14/128,254

(22) PCT Filed: Jun. 28, 2011

(86) PCT No.: PCT/US2011/042155
§ 371 (c)(1),
(2), (4) Date: Dec. 20, 2013

(87) PCT Pub. No.: WO2013/002764
PCT Pub. Date: Jan. 3, 2013

(65) Prior Publication Data
US 2014/0131131 A1  May 15, 2014

(30) Foreign Application Priority Data
Jun. 28, 2011 (of) .................. PCT/US11/42155

(51) Int. Cl.
*B62D 25/20* (2006.01)
*B60N 3/06* (2006.01)
(Continued)

(52) U.S. Cl.
CPC ................ *B60N 3/063* (2013.01); *B60T 7/042* (2013.01); *B60T 7/06* (2013.01); *B60T 7/102* (2013.01); *B60T 8/261* (2013.01); *B60T 11/101* (2013.01); *B62J 25/00* (2013.01); *B62K 5/027* (2013.01);
(Continued)

(58) Field of Classification Search
USPC ........ 180/90.6, 210, 211, 218, 219, 230, 316; 280/291, 294; 74/512, 561, 564
See application file for complete search history.

(56) References Cited

U.S. PATENT DOCUMENTS 1,583,894 A  5/1926  Melville
4,787,470 A * 11/1988  Badsey ..................... 180/210
(Continued)

FOREIGN PATENT DOCUMENTS

CN  2571654 Y  9/2003

OTHER PUBLICATIONS

International Search Report of PC/US2011/042155, Nov. 8, 2011, Blaine R. Copenheaver.
(Continued)

*Primary Examiner* — Toan To
(74) *Attorney, Agent, or Firm* — BCF LLP

(57) ABSTRACT

A straddle-type tracked vehicle comprises a frame and a foot board pivotally connected to the frame. A retainer selectively prevents the foot board from pivoting with respect to the frame. An actuator, operatively connected to at least one operative system of the vehicle, has a pedal disposed at least in part vertically above the foot board. In a first state of the retainer, the foot board is fixed in a default position by the retainer. The pedal is movable between a first position and a second position. The second position is vertically below the first position and vertically above the default position of the foot board. In a second state of the retainer, the foot board pivots such that at least a front of the foot board is at a position vertically below the default position. The pedal is movable to a third position vertically below the second position.

20 Claims, 13 Drawing Sheets

(51) Int. Cl.
   *B62J 25/00* (2006.01)
   *B62K 5/027* (2013.01)
   *B62K 5/05* (2013.01)
   *B62K 23/08* (2006.01)
   *B60T 7/06* (2006.01)
   *B62L 3/08* (2006.01)
   *B60T 7/04* (2006.01)
   *B60T 7/10* (2006.01)
   *B60T 8/26* (2006.01)
   *B60T 11/10* (2006.01)
   *G05G 1/30* (2008.04)

(52) U.S. Cl.
   CPC . *B62K 5/05* (2013.01); *B62K 23/08* (2013.01); *B62L 3/08* (2013.01); *G05G 1/30* (2013.01)

(56) References Cited

U.S. PATENT DOCUMENTS

| | | | |
|---|---|---|---|
| 5,893,424 A * | 4/1999 | Hisada | 180/90.6 |
| 6,113,121 A | 9/2000 | Mizuta | |
| 6,178,613 B1 | 1/2001 | Monson | |
| 6,478,103 B1 * | 11/2002 | Matsuura | 180/90.6 |
| 7,543,673 B2 | 6/2009 | Lachapelle et al. | |
| 8,151,925 B2 * | 4/2012 | Aramayo et al. | 180/219 |
| 8,272,460 B2 * | 9/2012 | Song et al. | 180/6.24 |
| 8,695,746 B2 * | 4/2014 | Holroyd et al. | 180/210 |
| 2005/0241547 A1 | 11/2005 | Colano | |
| 2006/0254842 A1 * | 11/2006 | Dagenais et al. | 180/215 |
| 2007/0251745 A1 * | 11/2007 | Codere et al. | 180/210 |
| 2008/0115991 A1 * | 5/2008 | Karube et al. | 180/90.6 |
| 2009/0178510 A1 | 7/2009 | Whitlock et al. | |

OTHER PUBLICATIONS

European Patent Office; Supplementary European Search Report of EP Application No. 11868539.5; Massimiliano Flori; Mar. 10, 2015; Munich, Germany.

English abstract of CN2571654Y; retrieved from http://worldwide.espacenet.com/publicationDetails/biblio?CC=CN&NR=2571654Y&KC=Y&FT=D&ND=3&date=20030910&DB=worldwide.espacenet.com&locale=en_EP on May 21, 2015.

* cited by examiner

VEHICLE FOOT BOARD AND PEDAL ASSEMBLY

TECHNICAL FIELD

The present invention relates to foot board and pedal assemblies of straddle-type wheeled vehicles.

BACKGROUND

Wheeled straddle vehicles have foot pegs and/or foot boards located vertically below the seat on each side of the vehicle, for the driver to secure his/her feet onto. Examples of such foot pegs can be found on most motorcycles. They are cylindrical outward extensions where the user rests a portion of a bottom of his/her foot. Because of their cylindrical shape, the foot pegs allow the user to use his/her ankle to position his/her foot at different angles. The foot boards are generally flat surfaces, where the user rests a majority of his/her feet. The foot boards and the foot pegs are both fixed to the frame.

To brake the vehicle, a brake pedal is disposed forward of and vertically above the right foot peg (or right foot board, if the vehicle is equipped with foot boards). When driving, the driver disposes a middle or rear part of his/her right foot on the foot peg (or foot board), and a front part of his/her foot on the brake pedal. When he/she desires to brake, the driver presses the front of his/her right foot onto the brake pedal.

In some cases, the braking system of the vehicle can be in such condition that additional hydraulic pressure is needed. One way to provide hydraulic pressure is to push down on the brake pedal. When the vehicle has foot boards, the brake pedal's travel is limited by the presence of the foot board. When the vehicle has foot pegs however, there is no interference between the brake pedal and the foot pegs, which permits increased travel of the brake pedal compared to when the vehicle has driver foot pegs. The user pivots his/her foot around the foot peg to position the brake pedal at the desired position. While the foot pegs provide a greater travel for the brake pedal, the foot boards provide better comfort.

Therefore, there is a need for a vehicle pedal assembly that would allow a greater pedal travel while providing the comfort of the foot board. There is also a need for a system that would modify a condition of an altered braking system of a vehicle when using the brake pedal.

SUMMARY

In one aspect a straddle-type vehicle is provided. The vehicle comprises a frame. A straddle seat is connected to the frame. At least two wheels are operatively connected to the frame. A steering assembly is connected to the frame forwardly of the straddle seat. The steering assembly is operatively connected to at least one of the at least two wheels. An engine is connected to the frame. The engine is operatively connected to at least one of the at least two wheels. A foot board is pivotally connected to the frame. A retainer is connected between the frame and the foot board. The retainer selectively prevents the foot board from pivoting with respect to the frame. An actuator is movably connected to the frame. The actuator is operatively connected to at least one operative system of the vehicle. The actuator has a pedal disposed at least in part vertically above the foot board. In a first state of the retainer, the foot board is fixed in a default position with respect to the frame by the retainer. The pedal is movable between a first position and a second position. The second position of the pedal is vertically below the first position of the pedal. The first and second positions of the pedal are vertically above the default position of the foot board. In a second state of the retainer, the foot board pivots such that at least a front of the foot board is at a position vertically below the default position. The pedal is movable to a third position. The third position of the pedal is vertically below the second position of the pedal.

In a further aspect, at least one pedal sensor is connected to the actuator. The at least one pedal sensor senses a position of the pedal. A controller is communicating with the at least one pedal sensor and the retainer. When the at least one pedal sensor senses that the pedal is vertically at or above a predetermined position, the controller controls the retainer to be in the first state. When the at least one pedal sensor senses that the pedal is vertically below the predetermined position, the controller controls the retainer to be in the second state.

In an additional aspect, the retainer includes an electromagnet assembly having a first portion connected to the foot board and a second portion connected to the frame. When the at least one pedal sensor senses that the pedal is vertically at or above a predetermined position, the controller sends current to the electromagnet assembly to connect the first and second portions together. When the at least one pedal sensor senses that the pedal is vertically below the predetermined position, no current is sent to the electromagnet assembly and the first and second portions are disconnected from each other.

In a further aspect, the predetermined position of the pedal is the second position of the pedal.

In an additional aspect, the retainer selectively engages with the foot board to prevent the foot board from pivoting with respect to the frame.

In a further aspect, the retainer includes a hook and a pin. At least one of the pin and hook is operatively connected to the controller. When the at least one pedal sensor senses that the pedal is vertically at or above the predetermined position, the controller controls the at least one of the hook and the pin to engage the retainer with the foot board. When the at least one pedal sensor senses that the pedal is vertically below the predetermined position, the controller controls the at least one of the hook and the pin to disengage the retainer from the foot board.

In an additional aspect, the at least one of the pin and hook being operatively connected to the controller is the pin. The vehicle further comprises a solenoid operatively connected to the pin. The solenoid is in communication with the controller. The solenoid is selectively moving the pin in and out of engagement with the hook.

In a further aspect, the at least one operative system of the vehicle is a braking system operatively connected to at least one of the at least two wheels for braking the vehicle. The actuator is a braking actuator. The pedal is a brake pedal.

In an additional aspect, the at least one operative system of the vehicle is a braking system operatively to at least one of the at least two wheels for braking the vehicle. The actuator is a braking actuator. The pedal is a brake pedal. The controller only controls the retainer to be in the second state when the braking system experiences a loss of hydraulic pressure below a predetermined value, thereby permitting the brake pedal to move vertically below the predetermined position.

In a further aspect, the vehicle comprises at least one pressure sensor of the braking system. The controller is in connection with the at least one pressure sensor. The controller is controlling the retainer to be in the second state when the controller has determined that the braking system has experienced the loss of hydraulic pressure below the predetermined value based on information received from the at least one pressure sensor.

In an additional aspect, the retainer is movably connected to the frame. In the first state of the retainer, the retainer engages the foot board. In the second state of the retainer, the retainer disengages from the foot board.

In a further aspect, the retainer moves between the first and second states based on a position of the pedal.

In an additional aspect, the pedal selectively engages the retainer to move the retainer between the first and second states.

In a further aspect, when the pedal is moved between the first and second positions, the pedal is spaced from the retainer.

In an additional aspect, the pedal is disposed at least in part laterally between the foot board and the frame.

In a further aspect, the at least one operative system of the vehicle is a braking system operatively connected to at least one of the at least two wheels for braking the vehicle. The actuator is a braking actuator. The pedal is a brake pedal.

In an additional aspect, upon a loss in hydraulic pressure in the braking system, the pedal is movable vertically below the second position. Moving the pedal to a position vertically below the second position causes the retainer to be in the second state thereby disengaging the retainer from the foot board to permit the pedal to move to the third position.

In a further aspect, the retainer is a hook selectively engaging a pin of the foot board.

In an additional accept, the retainer is spring loaded and biased toward a position for engaging the foot board.

For purposes of this application, terms related to spatial orientation, such as "front", "back", "rear", "left", "right", "upward", "downward", "above", and "below", are as they would normally be understood by a rider of the vehicle sitting on the vehicle in a forward facing, driving position.

Embodiments of the present invention each have at least one of the above-mentioned aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

A three wheel vehicle 10 having two front wheels, and one single rear wheel is described herein. However, it is contemplated that the vehicle could also have one front wheel and two rear wheels, could have only two wheels or more than three wheels. Also, several embodiments of foot board and pedal assemblies of the vehicle are described in operative connection with several embodiments of a braking system. However, it is contemplated that the foot board and pedal assemblies could be used in operation with another (or more than one) operative systems of the vehicle, such as a gear shifting mechanism of the vehicle.

Figure 1:
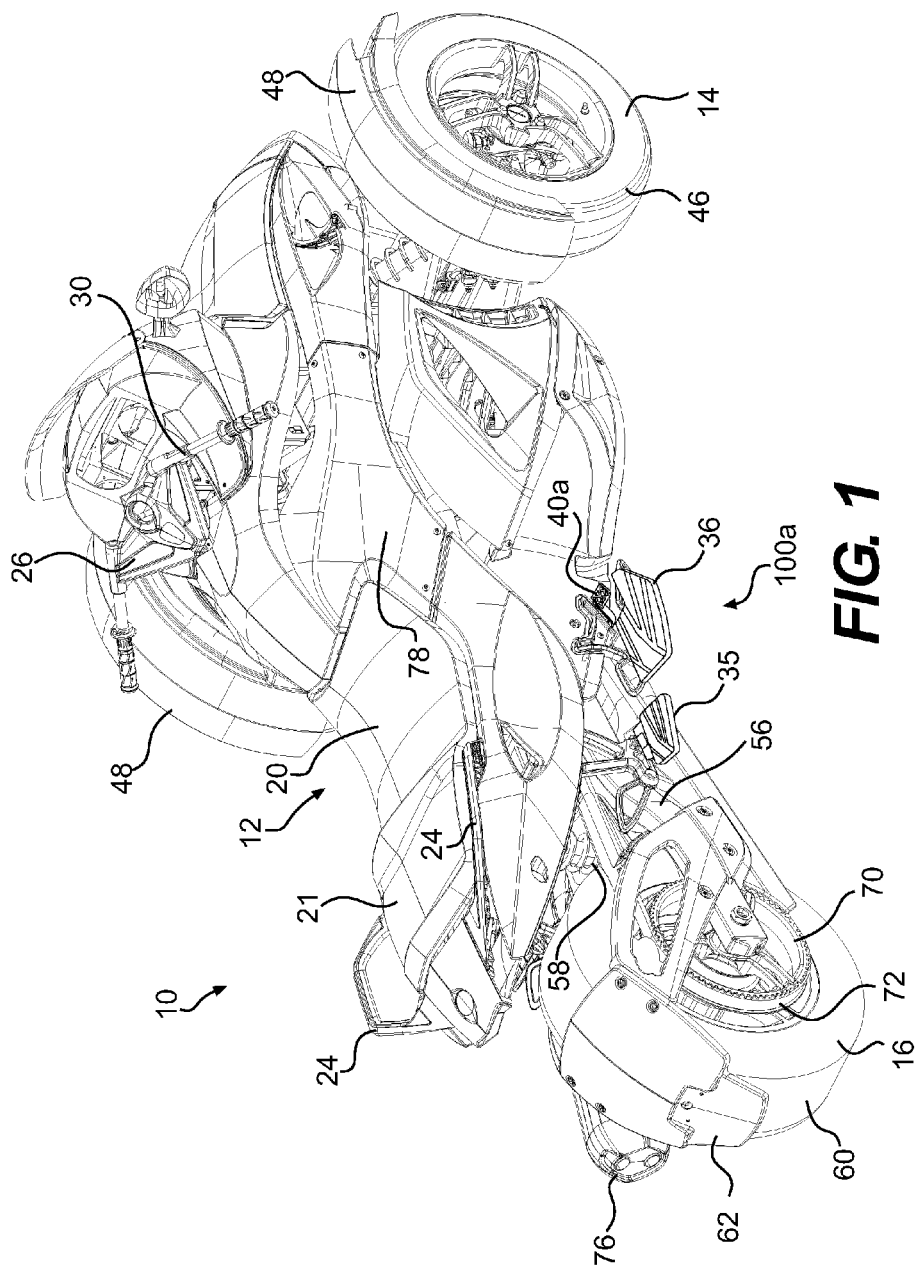
FIG. 1 is a perspective view, taken from a rear, right side, of a straddle-type vehicle.
Figure 2:
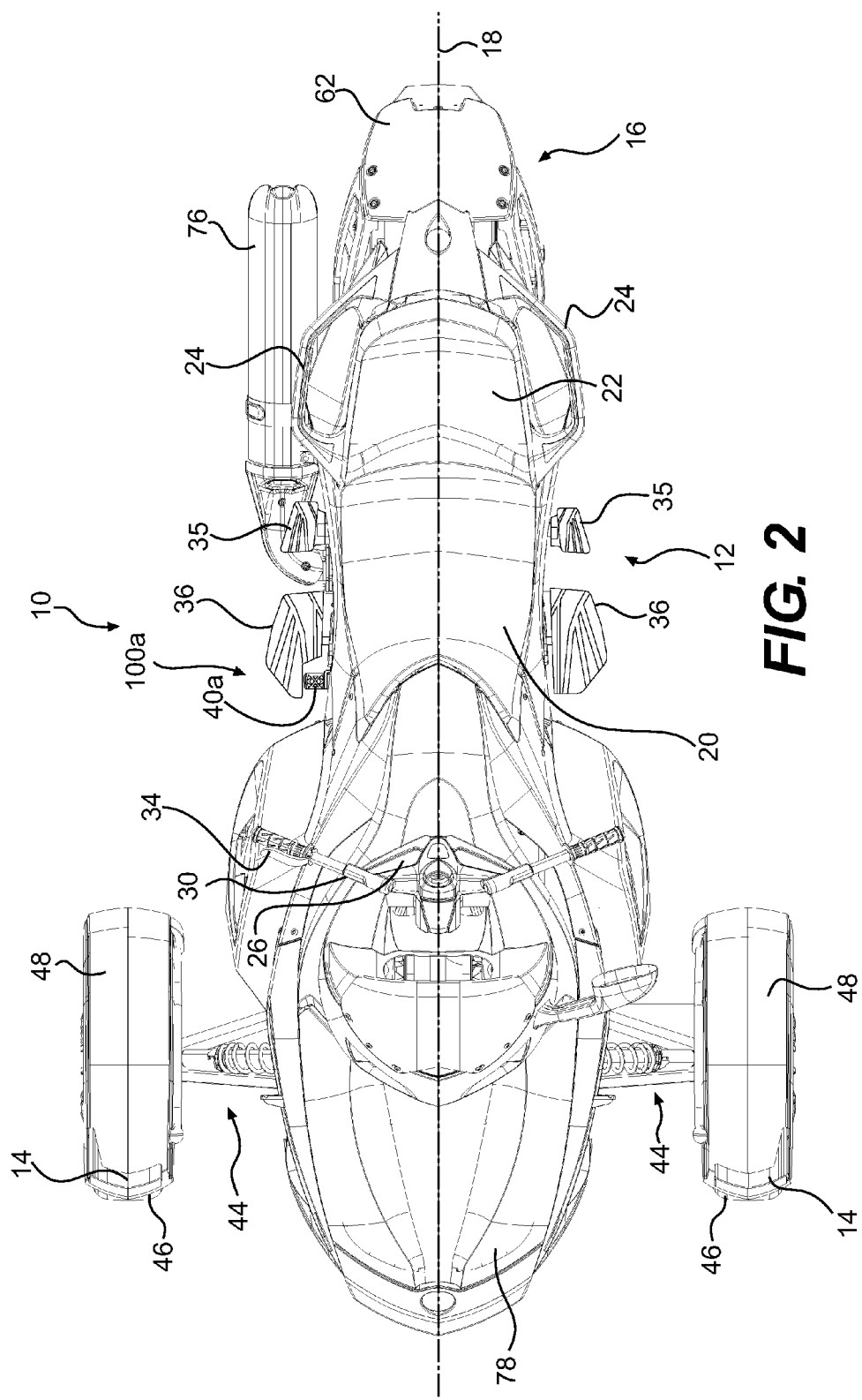
FIG. 2 is a top plan view of the vehicle of FIG. 1.

Referring to FIGS. 1 and 2, a vehicle 10 has two front wheels 14, and one single rear wheel 16. The vehicle 10 has a straddle seat 12 located at least partially rearwardly of a center of the vehicle 10 and disposed along a longitudinal centerline 18 thereof. The straddle seat 12 has a first portion 20 for accommodating a driver, and a second portion 21 for accommodating a passenger behind the driver. The second portion 21 is higher than the first portion 20 to permit the passenger to see in front of the vehicle 10 over the driver. A pair of handles 24 are provided on either side of the second portion 21 for the passenger to hold onto. It is contemplated that the straddle seat 12 could be disposed at a different longitudinal location depending on the particular ergonomics of the vehicle 10. It is also contemplated that the straddle seat 12 could only have the first portion 20.

A steering assembly 26 is disposed forwardly of the straddle seat 12 to allow a driver to steer the two front wheels 14. The steering assembly has a handlebar 30 connected to a steering column 28 (shown in FIG. 3). The steering column 28 is connected to the two front wheels 14 via a steering linkage (not shown), such that turning the handlebar 30 turns the steering column 28 which, through the steering linkage, turns the wheels 14. The steering assembly is provided with a power steering unit 29 (shown in FIG. 3) which facilitates steering of the vehicle 10. It is contemplated that the power steering unit 29 could be omitted. The handlebar 30 is provided with handles 27 for the driver to hold. The right handle 27 can twist and acts as the throttle controller for the engine 32. It is contemplated that the throttle could also be controlled by a separate lever disposed near one of the handles 27. A hand brake lever 34 is provided near the right handle 27 for braking the vehicle 10. It is contemplated that the hand lever 34 could be omitted. As seen in the Figures, the hand brake lever 34 is provided generally forwardly of the right handle 27 so as to be actuated by multiple fingers of a user. However, it is contemplated that the hand brake lever 34 could be provided generally forwardly of the left handle. Other types of brake levers commonly known to those skilled in the art are also contemplated.

Figure 9:
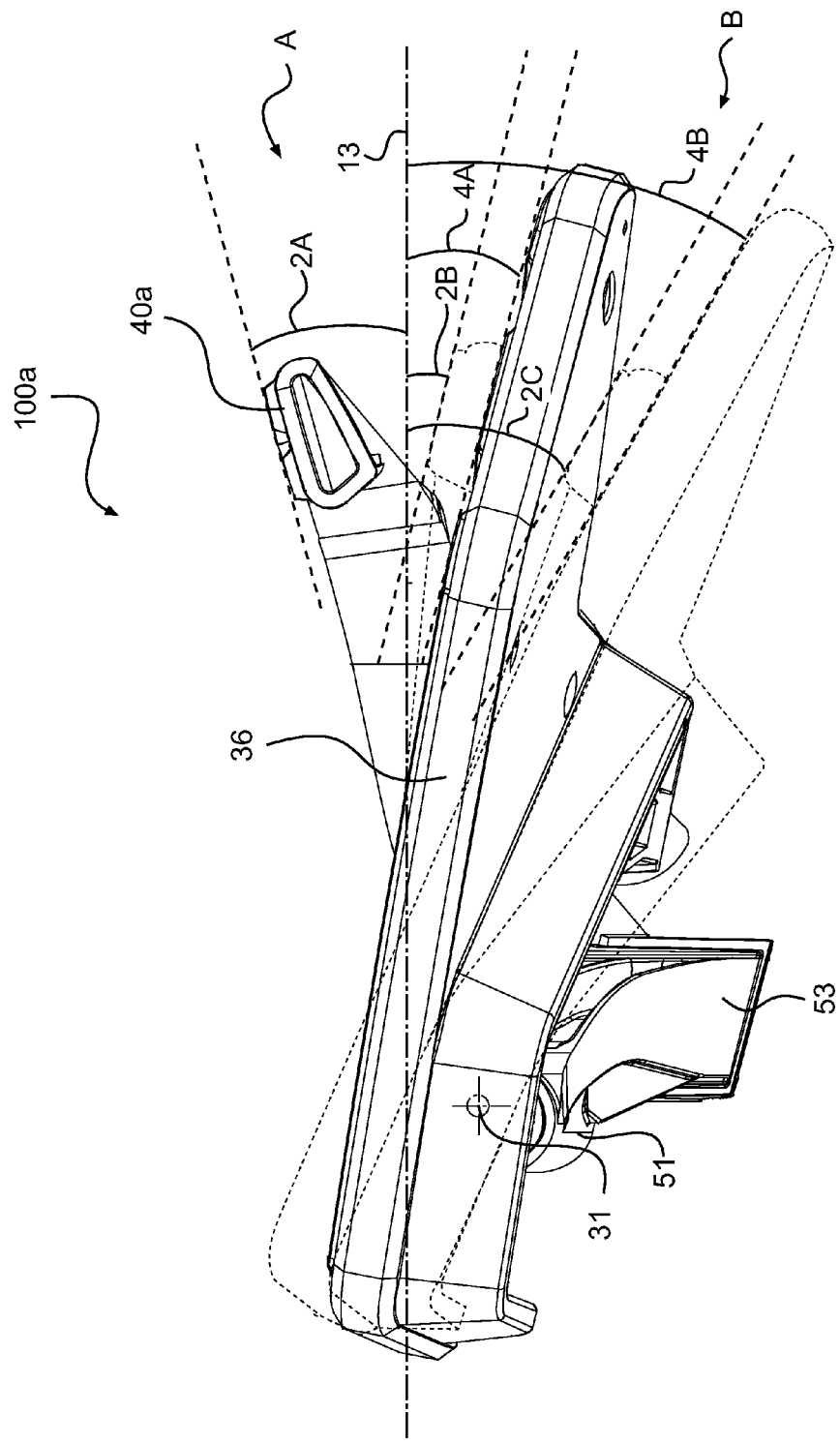
FIG. 9 is a right side elevation view of the foot board and pedal assembly of FIG. 5 with the position B shown in dotted lines.

A pair of driver foot boards 36 (left and right) is provided on either side of the vehicle 10 below the first portion 20 of the straddle seat 12 for a driver to rest his/her feet thereon. A pair of passenger foot boards 35 is provided on either side of the vehicle 10 below the second portion 21 of the straddle seat 12 for a passenger to rest his/her feet thereon. It is contemplated that the passenger foot boards 35 could be replaced by passenger foot pegs. As best seen in FIG. 9 for the right foot board 36, the foot boards 36 are inclined slightly downwardly for better contact between the foot of the user and the foot boards 36 during the riding of the vehicle 10. It is contemplated that the foot boards 36 could be disposed horizontally or be inclined slightly upwardly. The foot boards 36 include a plurality of grips 37 (shown in FIG. 5) to ensure better contact between the foot of the driver and the foot board 36. It is contemplated that the plurality of grips 37 could be omitted or could be different from the ones shown in the Figures.

A brake actuator 40*a* including a brake pedal 41 is provided on a right side of the vehicle 10 below the first portion 20 of the straddle seat 12 for braking the vehicle 10. It is contemplated that the brake actuator 40*a* could be disposed on a left side of the vehicle 10. The brake actuator 40*a* is provided proximate to the right driver foot board 36 such that the driver can actuate the brake actuator 40*a* with a front portion of his/her foot while a rear portion of his/her foot remains on the right driver foot board 36. As best seen in FIG. 9, the brake pedal 41 is normally inclined slightly upwardly. It is contemplated that the brake pedal 41 could be normally disposed horizontally or be inclined slightly downwardly. The brake actuator 40*a* and the right driver foot board 36 also form part of a foot board and pedal assembly 100*a* (or 100*b*, 100*c*). Embodiments of foot board and pedal assemblies 100*a*, 100*b*, 100*c* will be described in greater detail below.

Figure 3:
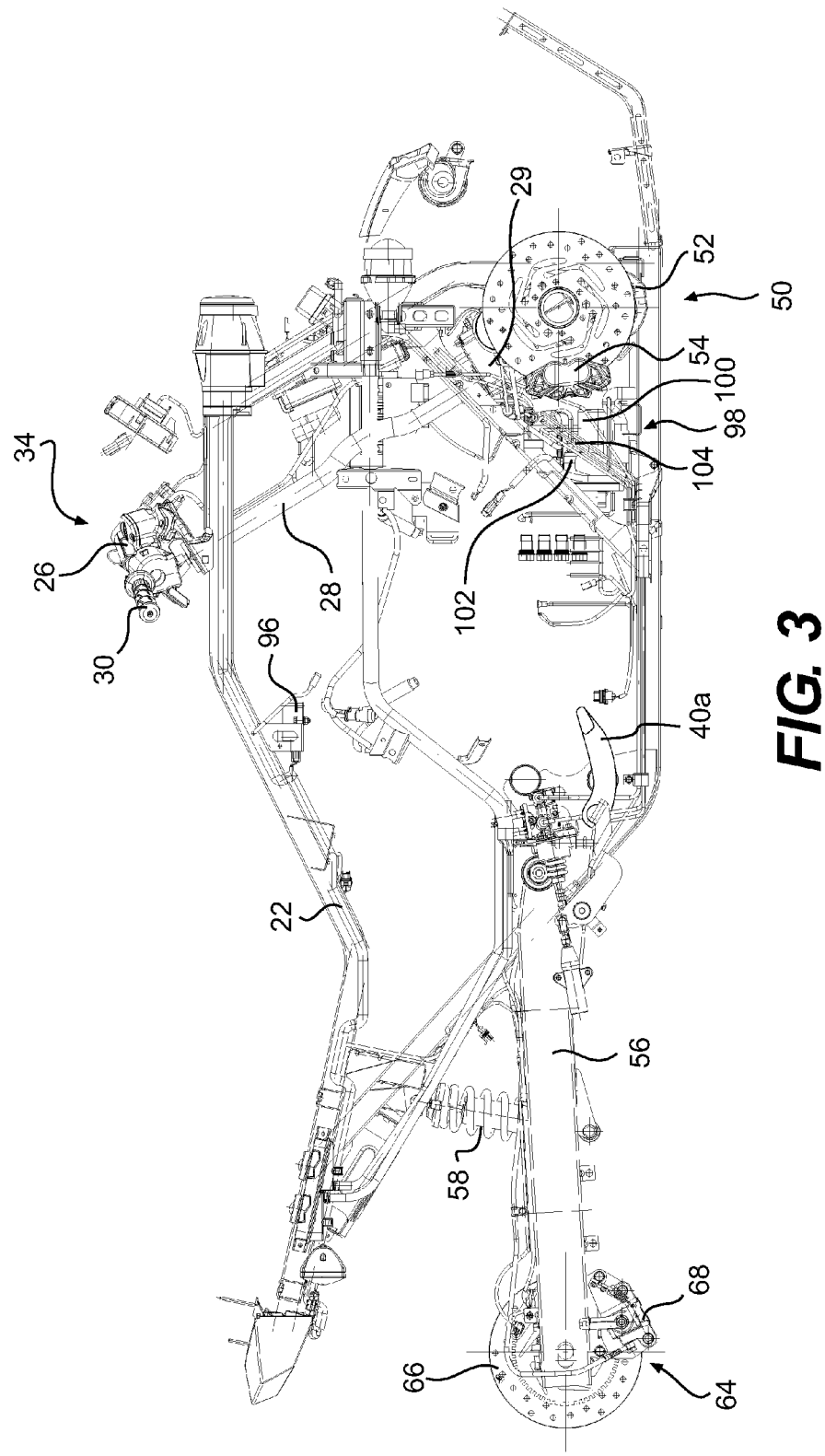
FIG. 3 is a right side elevation view of a frame of the vehicle of FIG. 1 with steering, braking components and rear suspension attached thereto.

Each of the two front wheels 14 is mounted to the frame 22 (shown in FIG. 3) of the vehicle 10 via a suspension assembly 44. The suspension assembly 44 is preferably a double A-arm suspension, but it is contemplated that other types of suspensions could be used, such as a McPherson suspension. As previously mentioned, the front wheels 14 are steered via a steering assembly. Each of the two front wheels 14 has a tire 46 thereon which is suitable for road use. The tires 46 are preferably inflated to a pressure between 138 kPa and 345 kPa. It is contemplated that the tires 46 could be inflated at other pressures. A fairing 48 is disposed over each tire 46 to protect the driver from dirt and water which can be lifted by the tire 46 while it is rolling. Each of the two front wheels 14 is also provided with a brake 50. As best seen in FIG. 3, the brake 50 is preferably a disc brake mounted onto a wheel hub of each wheel 14. Other types of brakes are contemplated. The brakes 50 each have a rotor 52 mounted onto the wheel hub and a stationary caliper 54 straddling the rotor 52. The brake pads (not shown) are mounted to the caliper 54 so as to be disposed between the rotor 52 and the caliper 54 on either sides of the rotor 52. By applying hydraulic pressure to a piston (not shown) inside the caliper 54, as will be discussed in greater details below, the brake pads squeeze the rotor 52 which, through friction, brakes the wheel 14.

The rear wheel 16 is mounted to the frame 22 via a swing arm 56. The swing arm 56 has two arms pivotally mounted at a front thereof to the frame 22 and between which the rear wheel 16 is rotatably mounted at the rear of the two arms. A shock absorber 58 is disposed between the swing arm 56 and the frame 22. The rear wheel 16 has a tire 60 thereon which is suitable for road use. The tire 60 is wider than the tires 46. It is contemplated that the tire 60 could have a smaller width or the same width as the tires 46. It is also contemplated that the rear wheel 16 could have two or more tires disposed next to each other thereon. The tire 60 is inflated to a pressure between 138 kPa and 345 kPa. It is contemplated that the tire 60 could be inflated at other pressures. A fairing 62 is disposed over the tire 60 to protect the driver from dirt and water which can be lifted by the tire 60 while it is rolling. The rear wheel 16 is provided with a brake 64. As best seen in FIG. 3, the brake 64 is a disc brake mounted to a right side of wheel 16. Other types of brakes are contemplated. The brake 64 has a rotor 66, a caliper 68, brake pads (not shown), and a piston (not shown) similar to those used with brakes 50. The brake 64 brakes the rear wheel 16 in the same way as the brakes 50 brake the front wheels 14. A wheel sprocket 70 is mounted to a left side of the rear wheel 16. A belt 72 is disposed about the wheel sprocket 70 and an engine sprocket (not shown) to transmit power from the engine 32 to the rear wheel 16. The engine sprocket is disposed about the output shaft 74 of the engine 32. The output shaft 74 extends horizontally and perpendicularly to the longitudinal centerline 18 of the vehicle 10. It is contemplated that a continuously variable transmission (CVT) could be provided between the output shaft 74 and the engine sprocket.

An exhaust pipe 76 extending on the right side of the vehicle 10 towards the rear thereof is attached to an exhaust port (not shown) of the engine 32 to improve engine performance and to reduce the noise level of the engine 32. A vehicle body 78 is attached to the frame 22 in order to protect the components mounted to the frame 22 from the elements and to make the vehicle 10 aesthetically pleasing.

The vehicle 10 also includes other components not specifically described herein. Examples of these components are an air box, radiators, fuel tank, oil tank, and a battery.

Turning now to FIG. 3, an electronic brake control unit 98 will be described. The electronic brake control unit 98 is one example of possible electronic brake control unit for the vehicle 10.

The electronic brake control unit 98 consists of a pump 99 for pumping hydraulic fluid to the brakes 50, 64, a valve box containing at least three valves 103', 103", 103''' (FIG. 4) (one for each of the brakes 50, 64), and an electronic controller 104 for receiving the operating condition signal and controlling actuation of the valves 103', 103", 103''' and pump 99 according to the operating condition signal. The valves 103', 103", 103''' are preferably solenoid valves which can be opened, closed, and cycled between these two positions. By modifying the speed and duration of the cycling of the valves, the amount of braking force applied by a brake 50, 64 can be controlled.

The construction of the electronic brake control unit 98 allows it to control actuation of the brakes 50, 64 it two ways. The first way consists in regulating the flow of hydraulic fluid to the brakes 50, 64 when the hand lever 34 or the brake actuator 40*a* is actuated, as will be explained in greater detail below. The second way consists in actuating the brakes 50, 64 in response to the operating condition signal even when neither of the hand lever 34 and the brake actuator 40*a* has been actuated. This is achieved by actuating the pump 99 to pressurize hydraulic fluid and using that fluid to actuate the brakes 50, 64. It is contemplated that the pump 99 could be used to boost hydraulic pressure in the braking system when the hand lever 34 or actuator 40 is actuated as well.

Figure 4:
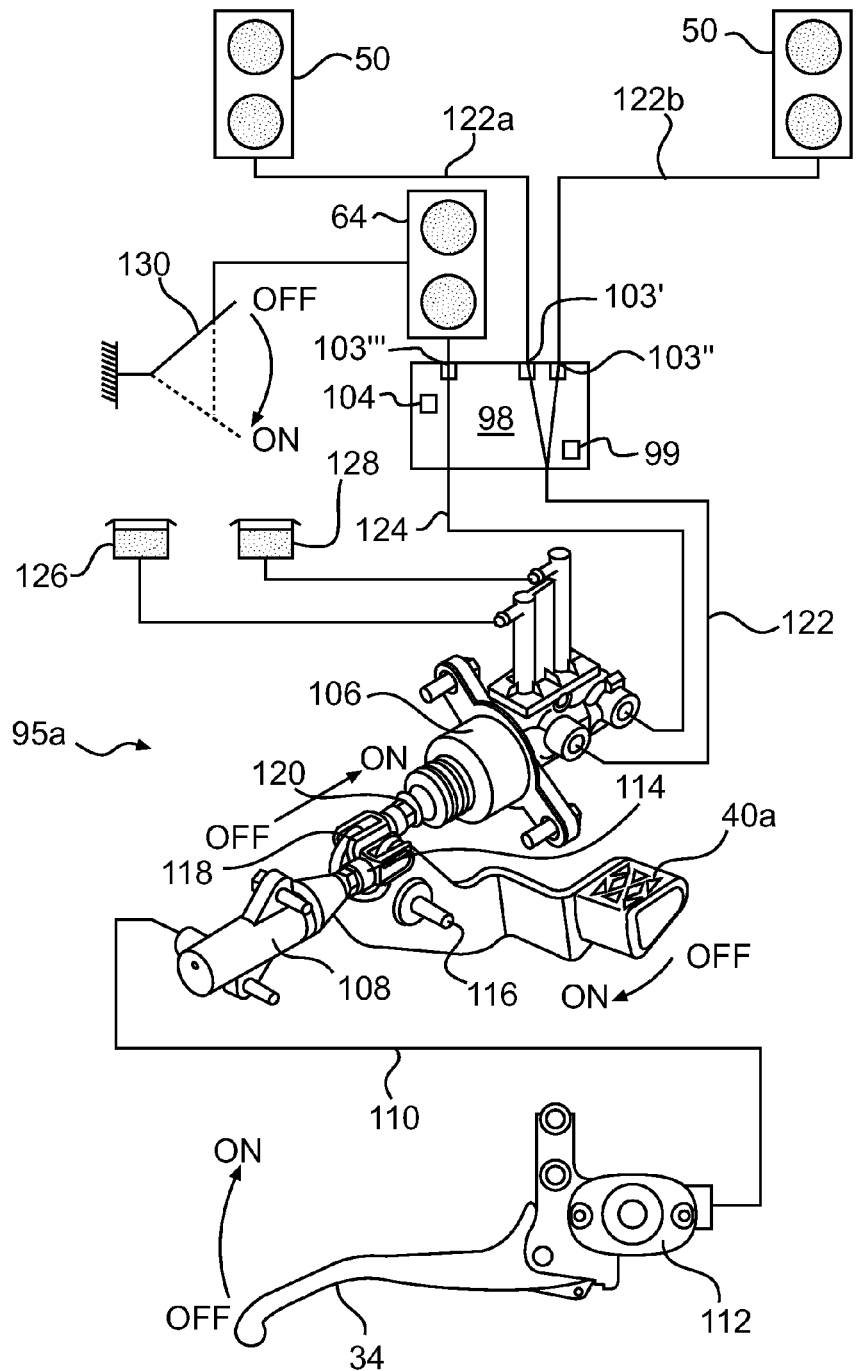
FIG. 4 is a schematic representation of a first embodiment of a braking system for the vehicle of FIG. 1.

FIG. 4 schematically illustrates a first embodiment of a braking system 95*a* of the vehicle 10. The braking system 95*a* is one example of possible braking system for the vehicle 10.

Other embodiments of braking systems are contemplated, some of which are described below.

Both the hand brake lever 34 and the brake actuator 40a actuate the same master cylinder 106. The master cylinder 106 is a device which uses two pistons in a single cylinder to supply hydraulic pressure to two circuits and can be adjusted to provide different hydraulic pressure to the two circuits. The master cylinder 106 actuates the brakes 50, 64 through the electronic brake control unit 98 in response to actuation of either of the hand brake lever 34 and the brake actuator 40a. Since the master cylinder 106 actuates the brakes 50, 64, the braking system 95a reacts the same way regardless of which of the lever 34 or the actuator 40 is actuated. It is contemplated however that the degree of movement of the hand lever 34 may be different from the degree of movement of the brake actuator 40a to obtain the same braking force. Also, using one master cylinder 106 allows the electronic braking control unit 98 to operate as if there were only one brake lever even though there are two.

The hand brake lever 34 hydraulically communicates with a slave cylinder 108 via brake line 110. The slave cylinder 108 is mounted to the frame 22 of the vehicle 10. A hydraulic brake actuator 112, disposed adjacent to and actuated by the hand brake lever 34, hydraulically actuates the slave cylinder via brake line 110. The slave cylinder 108 is connected to the brake actuator 40a at a point 114 offset from a pivot point 116 of the brake actuator 40a. The brake actuator 40a is connected at point 118 to a linkage 120 which, when moved, actuates the master cylinder 106. It is contemplated that the brake actuator 40a could hydraulically actuate the master cylinder 106 as well.

Therefore, when the user actuates the hand brake lever 34, it causes the slave cylinder 108 to actuate the brake actuator 40a. The brake actuator 40a then actuates the master cylinder 106 via linkage 120. It is also contemplated that the hand brake lever 34 could directly mechanically actuate the brake actuator 40a without the assistance of hydraulic components such as the slave cylinder 108. When the user actuates the brake actuator 40a, it actuates the master cylinder 106 via linkage 120. Although actuating the hand brake lever 34 actuates the brake actuator 40a, it will be understood by those skilled in the art that actuating the brake actuator 40a does not actuate the hand brake lever 34 due to the hydraulic nature of the communication between these two components.

The master cylinder 106 hydraulically communicates with the front brakes 50 via brake line 122. The master cylinder 106 also hydraulically communicates with the rear brake 64 via brake line 124, thus creating two independent hydraulic circuits. Keeping the hydraulic communications between the master cylinder 106 and the front and rear brakes 50, 64 separate allows the vehicle 10 to brake even if one of the hydraulic circuits fails. For the same reason, the hydraulic fluid is supplied to the master cylinder 106 by two different hydraulic fluid reservoirs 126, 128. The hydraulic fluid reservoir 126 supplies the master cylinder 106 with hydraulic fluid to actuate the front brakes 50. The hydraulic fluid reservoir 128 supplies the master cylinder 106 with hydraulic fluid to actuate the rear brakes 64.

The brake line 122 enters the electronic brake control unit 98 and is separated into two brake lines 122, 123 in order to control the brakes 50 individually. The brake line 122 hydraulically communicates with the left brake 50 and the brake line 123 hydraulically communicates with the right brake 50. A valve 103' controls the flow of hydraulic fluid in brake line 122. A valve 103" controls the flow of hydraulic fluid in brake line 123. The brake line 124 also enters the electronic brake control unit 98 and a valve 103'" controls the flow of hydraulic fluid to the brake 64 in brake line 124.

By having the master cylinder 106 actuate the brakes 50, 64 through the electronic brake control unit 98, the electronic control unit 98 can selectively control actuation of the brakes 50, 64 with the valves 103' to 103'". When the master cylinder 106 is actuated by either of the hand brake lever 34 and the brake actuator 40a and an operating condition signal received by the electronic brake control unit 98 is outside of a predetermined range, which is indicative of an instability of the vehicle 10, the electronic brake control unit 98 controls the valves 103' to 103'" to obtain a braking force, as described above, that will provide a corrective effect, thus stabilizing the vehicle. For example, if the electronic brake control unit 98 determines that a braking force needs to be applied to the front left tire 46, the electronic control unit would maintain valve 103' opened to permit hydraulic pressure created by the master cylinder 106 to be transmitted from brake line 122 to brake line 122 to actuate the left brake 50 and would close valve 103" to prevent the right brake 50 from being actuated. Alternatively, the electronic brake control unit 98 may cycle the valves 103' and 103" between opened and closed positions at different rates such that the left brake 50 provides more braking than the right brake 50. Also, if the valves 103' and 103" have intermediate positions between the opened and closed positions, the electronic brake control unit 98 may position the valves 103' and 103" differently such that more hydraulic pressure is applied to the left brake 50 than to the right brake 50. The electronic brake control unit 98 also determines whether the rear wheel 16 needs to be braked and controls the valve 103'" accordingly. It is contemplated that pump 99 can be used to boost the hydraulic pressure inside brake lines 122, 123, and 124 should the electronic brake control unit 98 determine that the hydraulic pressure provided by the master cylinder 106 is insufficient. When the master cylinder 106 is not actuated and an operating condition signal received by the electronic brake control unit 98 is outside of a predetermined range, which is indicative of an instability of the vehicle 10, the electronic brake control unit causes the pump 99 to be actuated to provide hydraulic pressure to the brakes 50, 64 and the electronic brake control unit 98 controls the valves 103' to 103'", as described above, to correct the instability, thus actuating the brakes independently of the master cylinder 106. The electronic brake control unit 98 only selectively controls actuation of the brakes 50, 64 since if the operating condition signals are within a predetermined range, which indicates that the vehicle 10 is stable, the valves 103' to 103'" are opened, and the braking system 95a operates as if the electronic brake control unit 98 were not present.

A parking brake lever 130, in the form of either a hand or foot actuated lever, is linked to the rear brake 64, either mechanically or hydraulically. The parking brake lever 130 can actuate the brake 64 independently of the master cylinder 106 to lock the rear wheel 16 in a stationary position when the vehicle 10 is parked. This prevents the vehicle 10 from moving when it is parked.

Although the braking system 95a, which consists of the hand brake lever 34, hydraulic brake actuator 112, slave cylinder 108, brake actuator 40a, and master cylinder 106, is described in use with the electronic brake control unit 98, it is contemplated that it could be used without the electronic brake control unit 98 in some applications, such as in motorcycles for example.

Turning now to FIGS. 5 to 9, a first embodiment of the foot board and pedal assembly 100a will be described. The foot board and pedal assembly 100a includes the right driver foot board 36, the brake actuator 40a and a retainer 80a, which will be each described below. It is contemplated that the foot board and pedal assembly 100a could be located on a left side of the vehicle 10. The foot board and pedal assembly 100a is in operative connection with a second embodiment of the braking system 95b. It is contemplated that the foot board and pedal assembly 100a could be adapted to be in operative connection with the first embodiment of the braking system 95a, or with other embodiments of a braking system. It is also contemplated that the foot board and pedal assembly 100a could be in operative connection with one or more operative systems of the vehicle other than a braking system. For example, the foot board and pedal assembly 100a could be in operative connection with a gearing system of the vehicle 10, and in which case the pedal 41 would be a gear shifting pedal.

The right foot board 36 has similar features as the left foot board 36, which were both described above, except that the right foot board 36 includes an indentation 38 on a front inner side thereof and is selectively pivotable. The indentation 38 is disposed vertically below the brake actuator 40a and is designed to accommodate the pedal 41 when the brake actuator 40a is lowered toward the right foot board 36. It is contemplated that the indentation 38 could be replaced by a recess in the right foot board 36. It is also contemplated that the indentation 38 could be omitted. It is also contemplated that the indentation 38 could be disposed at a rear end of the right foot board 36 depending on a location of the pedal 41. It is also contemplated that the left foot board 36 could also have the indentation 38.

The right foot board 36 is selectively pivotally connected to the frame 22 about a pivot axis 31. A shaft 51 (best seen in FIG. 8) bolted to the right foot board 36 defines the pivot axis 31. The shaft 51 is surrounded by a bearing (not shown). The shaft 51 is bolted to the right foot board 36 via bracket 55 and bolts 57. A bearing (not shown) is disposed between the shaft 51 and the bracket 55. The bracket 55 is fixedly connected to the frame 22 via arm 53 and bolt 59. The arm 53 is shaped so that a connection of the right foot board 36 to the frame 22 is offset from the pivot axis 31. It is contemplated that the connection of the right foot board 36 to the frame 22 could be aligned with the pivot axis 31. It is contemplated that the arm 53 could be indirectly connected to the frame 22. For example, the arm 53 could be connected to the frame 22 via a bracket. It is contemplated that the bearing could be omitted.

The brake actuator 40a includes the pedal 41 and a pivoting arm 42. The pedal 41 is fixed to the pivoting arm 42. The pedal 41 includes a plurality of grips 45 to ensure better contact between the foot of the driver and the pedal 41. It is contemplated that the plurality of grips 45 could be omitted or could be different from the ones shown in the Figures. The pivoting arm 42 is pivotally connected to the frame 22 at the pivot point 116 via a bearing (not shown). It is contemplated that the bearing could be omitted, and that the pivoting arm 42 could be still pivotally connected to the frame 22. It is contemplated that the pivoting arm 42 could be indirectly connected to the frame 22. For example, the pivoting arm 42 could be connected to the frame 22 via a bracket. The pivoting arm 42 is curved along its length to accommodate the indentation 38 when the brake actuator 40a is lowered toward the right foot board 36.

The pivoting arm 42 has a pin 43a extending outwardly thereof. As will be described below, the pin 43a is in selective abutment with the retainer 80a depending on a position of the pedal 41, for operating the retainer 80a. It is contemplated that the retainer 80a could be actuated by an element of the vehicle 10 other than the pedal 41. For example, a switch on the handlebar 30 could be used to control a release of the retainer 80a. As mentioned above, the pedal 41 is operated by the driver to brake the vehicle 10. When the pedal 41 is moved downwards, a linkage 85, pivotally connected to the arm 42, moves a link 86 around a pin 87, so as to move a linkage 89 toward the master cylinder 106. When the linkage 89 is moved toward the master cylinder 106, hydraulic pressure in the brake lines 122, 124 increases and the brakes 50, 64 brake the front and rear wheels 14, 16. When the pedal 41 is released and moves upwards, the linkage 85 moves the link 86 around the pin 87, so as to move the linkage 89 away from the master cylinder 106. When the linkage 89 is moved away from the master cylinder 106, hydraulic pressure in the brake lines 122, 124 decreases and the brakes 50, 64 release pressure from the front and rear wheels 14, 16.

The retainer 80a is disposed laterally between the right foot board 36 and the brake actuator 40a. The retainer 80a includes a hook 82a pivotally connected to the frame 22, and a pin 39a extending laterally inwardly from the right foot board 36. The pin 39a is disposed rearwardly of the pin 43a. It is contemplated that the pin 39a could be disposed forwardly of the pin 43a depending on a position of the retainer 80a. The hook 82a selectively engages the pin 39a depending on a position of the pedal 41. The pin 39a is bolted to the right foot board 36 forward of the arm 53. It is contemplated that the pin 39a could be connected to the right foot board 36 by ways other than bolting. For example, the pin 39a could be integrally formed with the right foot board 36. The hook 82a is pivotally connected to the frame 22 via a pin 81. The pin 81 is surrounded by a bearing (not shown) and is bolted to the frame 22. The hook 82a is connected to a spring 84 which is fixed to the frame 22, such that the hook 82a is biased toward being engaged with the pin 39a (FIG. 5) when the right foot board 36 is in the default position. The hook 82a has a contact surface 33 onto which the pin 43a comes in selective abutment with the pedal 41. The retainer 80a is movable by the brake actuator 40a between a first state (shown in FIG. 5) where the hook 82a is engaged in the pin 39a and the right foot board 36 is prevented from moving, and a second state (shown in FIG. 7) where the hook 82a is disengaged from the pin 39a and the right foot board 36 is allowed to pivot with respect to the frame 22. It is contemplated that the retainer 80a could be disposed somewhere else with respect to the right foot board 36. It is contemplated that the bearing could be omitted. It is contemplated that the spring 84 could be omitted. It is contemplated that the contact surface 33 could be replaced by a recess or a flange, or any other abutment surface. It is also contemplated that the pin 39a could be connected to the frame 22 and the hook 82a could be connected to the right foot board 36.

With reference to FIG. 9, an operation of the right foot board and pedal assembly 100a will now be described.

Figure 5:
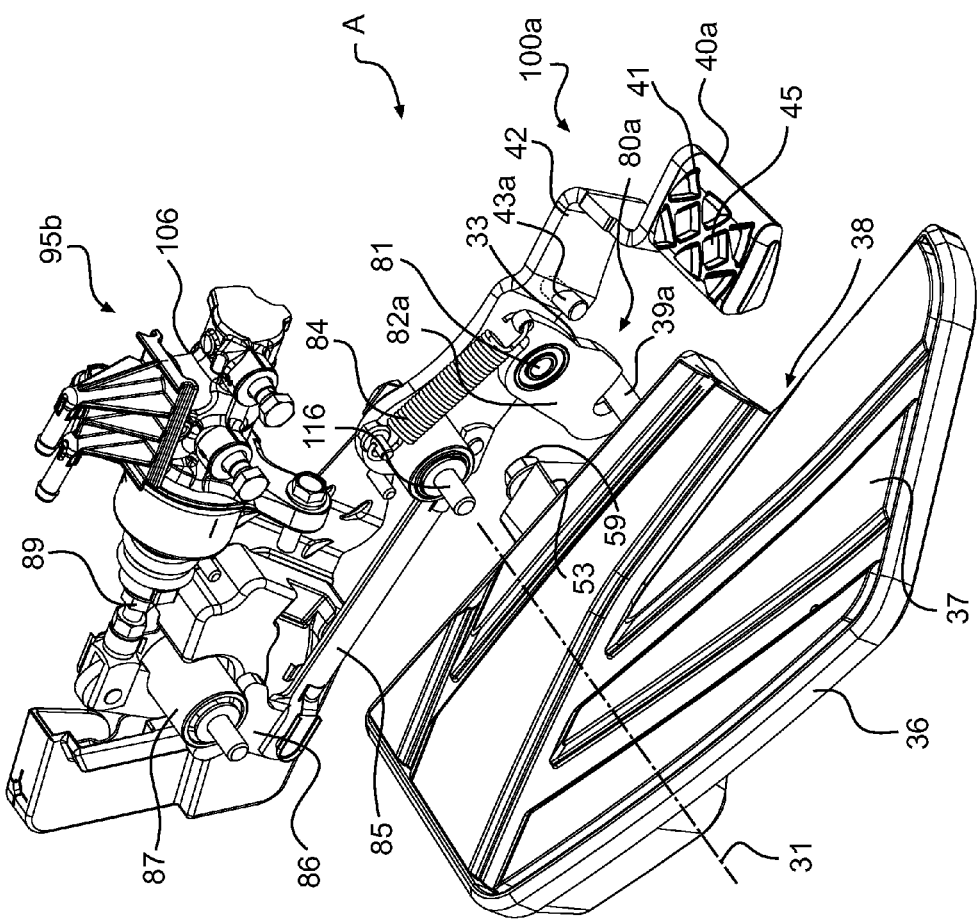
FIG. 5 is a perspective view, taken from a front, right side of a foot board and pedal assembly in a position A and a portion of a second embodiment of the braking system for the vehicle of FIG. 1.
Figure 6:
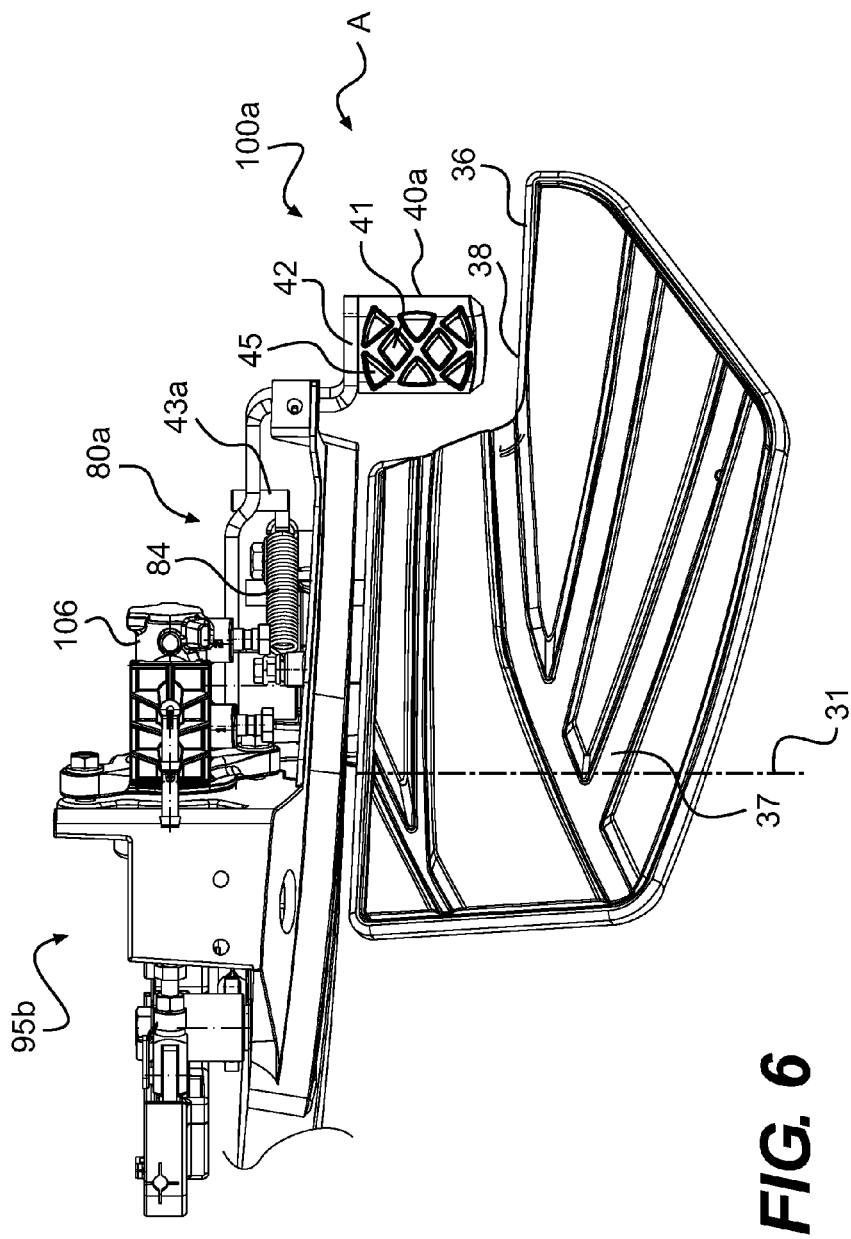
FIG. 6 is a top plan view of the foot board and pedal assembly of FIG. 5.
Figure 7:
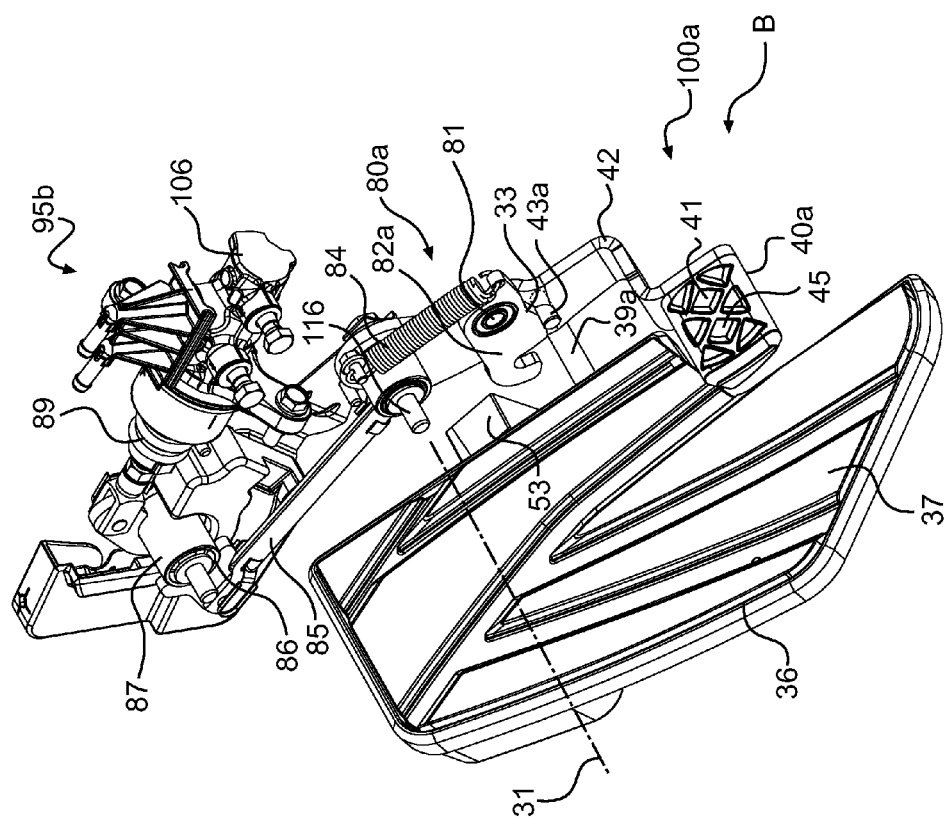
FIG. 7 is a perspective view, taken from a front, right side of the foot board and pedal assembly of FIG. 5 in a position B.
Figure 8:
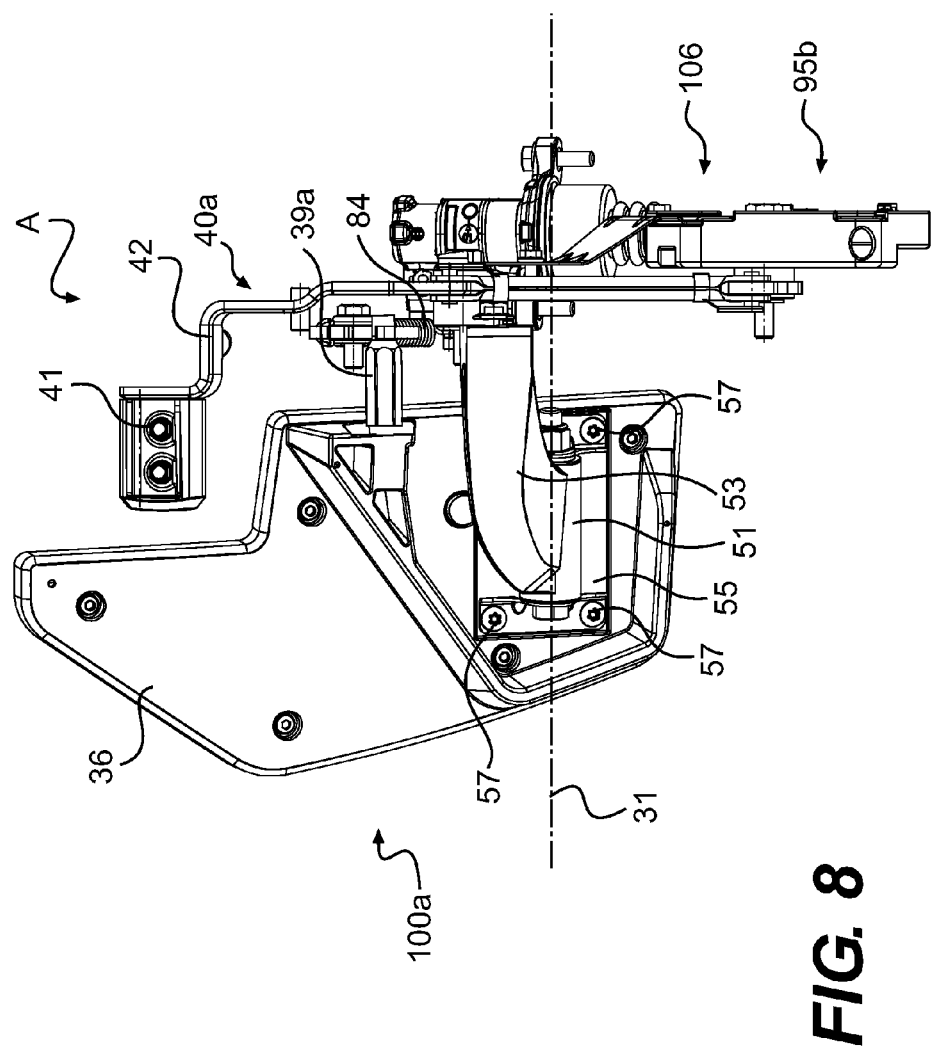
FIG. 8 is a bottom plan view of the foot board and pedal assembly of FIG. 5.

Under the normal operating conditions, the right foot board 36 is fixed to the frame 22 in the default position. The default position of the right foot board 36 is shown in FIG. 5, and in FIG. 9 (solid lines). In the default position, the right foot board 36 is fixed to the frame 22 with its front portion at an angle 4A with respect to a horizontal 13 downwardly thereof. It is contemplated that the default position of the right foot board 36 could be at other angles. It is contemplated that the front portion of the foot board 36 could be upward of the horizontal 13 and the default position. The pin 39a is engaged with the hook 82a such that the retainer 80a is engaged in the right foot board 36.

Still under the normal operating conditions, the pedal 41 is disposed vertically above the right foot board 36 and is movable between positions A and B to brake the vehicle 10. Position A corresponds to the brake pedal 41 being not actuated, and position B corresponds to the brake pedal being at maximal braking available under normal operating conditions. The user varies an intensity of braking by pushing the pedal 41 more or less toward the position B. The position A (shown in solid lines in FIG. 9) is defined by an angle 2A with respect to the horizontal 13 upwardly thereof, and the position B (shown in dotted lines in FIG. 9) is defined by an angle 2B with respect to the horizontal 13 downwardly thereof. It is contemplated that the angles 2A and 2B could be other than shown in the Figures. For example, the angles 2A could be downward of the horizontal 13. Under the normal operating conditions, the user cannot move the pedal 41 below the position B toward the right foot board 36 since the brakes 50,64 are acting on the front and rear wheels 14, 16 to stop their rotation.

When not enough braking can be generated when the pedal 41 is in the position B, the braking system 95*a* is said to be in an altered operating condition. Alterations of the braking system 95*a* are caused by a loss of hydraulic pressure in at least one of the brake lines 122, 124. It is contemplated that the altered conditions could not be related to a loss of hydraulic pressure. Because the braking system 95*a* is altered, the user is able to move the pedal 41 downward past the position B toward the right foot board 36 which is in the default position. It is contemplated that moving the pedal 41 downward past the position B could not be a consequence of an altered operational system of the vehicle 10. As the user moves the pedal 41 past the position B, the pin 43*a* abuts the contact surface 33 of the hook 82*a*. The movement of the pin 43*a* forces the hook 82*a* to rotate about pivot point 81, which results in pushing the hook 82*a* away from the pin 39*a* as the pedal 41 is lowered. When the hook 82*a* has been completely pushed away from the pin 39*a*, the brake actuator 40*a* releases the retainer 80*a* from the right foot board 36. The right foot board 36 is free to pivot downwards to a position shown in dotted lines in FIG. 9 and defined by an angle 4B with respect to the horizontal 13. As shown in the Figures, because of the position of the pivot axis 31, only a front portion of the foot board 36 is pivoted downwards below the default position. It is contemplated that the pivot axis 31 could be disposed somewhere else on the foot board 36 so that the entire foot board 36 may be pivoted downwards below the default position. It is contemplated that the position of the right foot board 36 defined by angle 4B could be different than shown in the Figures. For example, the angle 4B could be upward of the horizontal 13 if the angle 4A was above the horizontal 13. Because the right foot board 36 is moveable downwards, the pedal 41 can be moved to a position C that was not accessible when the right foot board 36 was fixed in the default position. The position C is vertically below the position B. The position C is defined by an angle 2C with respect to the horizontal 13 downwardly thereof. Although the position C is shown in the Figures to be vertically below a level of the default position of the right foot board 36, it is contemplated that the position C could be vertically above the level of the default position of the right foot board 36. It is contemplated that the angle 2C could be different from the one shown in the Figures. For example, the angle 2C could be upward of the horizontal 13 if the angle 2B is upwardly of the horizontal 13. It is contemplated that the pedal 41 could be moved to the position C when the vehicle 10 is operating in conditions that are not related to an alteration or a failure of a system or component of the vehicle 10.

When the user has stopped the vehicle 10, the user can reengage the hook 82*a* onto the pin 39*a* manually. The user pivots the foot board 36 back toward its default position. By doing so, the pin 39*a* abuts the hook 82*a* and moves the hook 82*a* as the pin 39*a* slides along a rounded portion of the hook 82*b* until it reengages with the hook 82*a*. It is contemplated that the hook 82*a* could be reengaged onto the pin 39*a* automatically without the user manually moving the right foot board 36. It is also contemplated that the user would have to manually move the hook 82*a* to reengage the hook 82*a* with the pin 39*a*.

Figure 10:
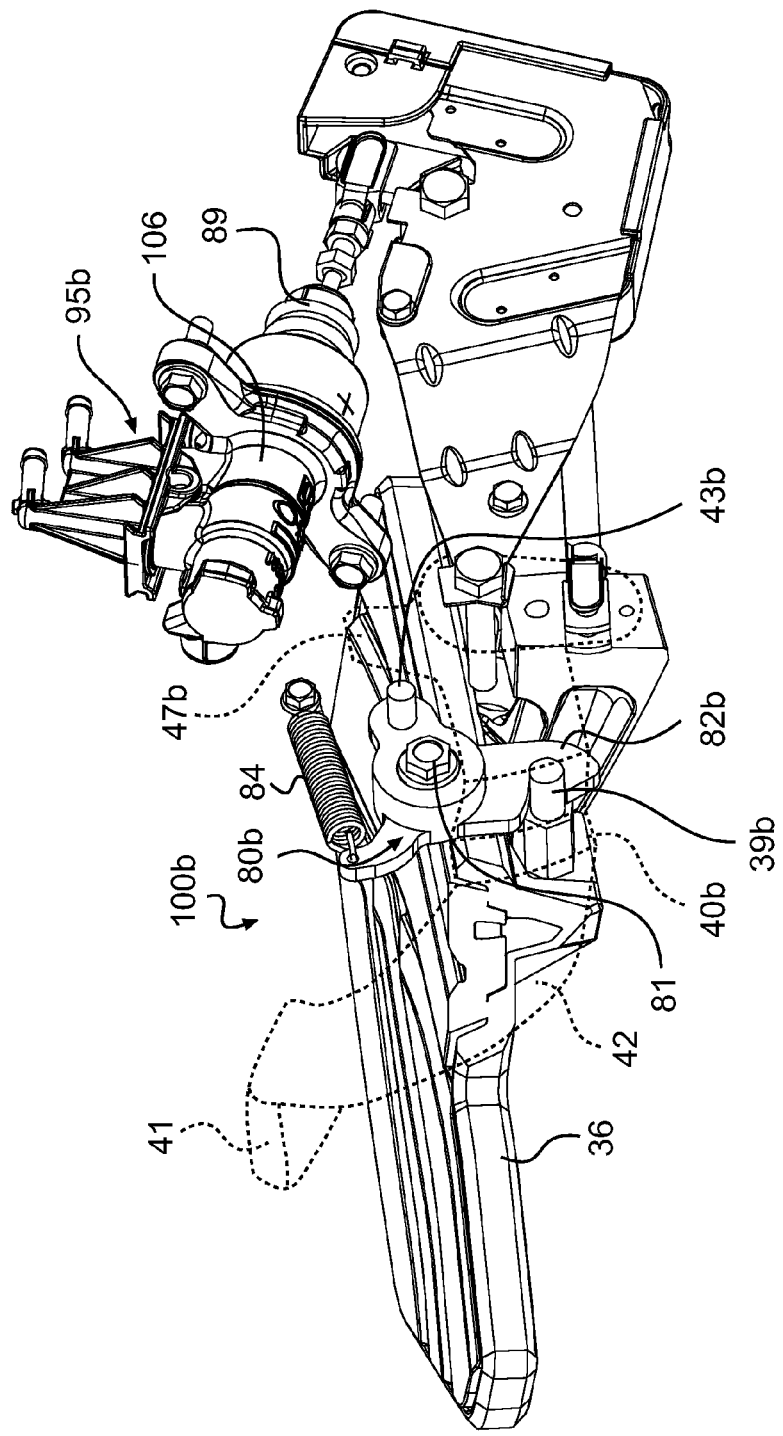
FIG. 10 is a perspective view taken from a front, left side of a second embodiment of a foot board and pedal assembly for the vehicle of FIG. 1 with a brake actuator of the foot board and pedal assembly shown in dotted lines.

Turning now to FIG. 10, a second embodiment of the foot board and pedal assembly 100*b* will be described. Elements common to the foot board and pedal assembly 100*a* will be referred to using the same reference numerals, and will not be described herein again in detail. The foot board and pedal assembly 100*b* is in operative connection with the second embodiment of the braking system 95*b*. However, it is contemplated that the foot board and pedal assembly 100*b* could be in operative connection with the first embodiment of the braking system 95*a*, or with other embodiments of the braking system. It is also contemplated that the foot board and pedal assembly 100*b* could be in operative connection with one or more operative systems of the vehicle other than the braking system. For example, the foot board and pedal assembly 100*b* could be in operative connection with a gearing system of the vehicle 10, and in which case the pedal 41 of the foot board and pedal assembly 100*b* would be a gear shifting pedal.

The foot board and pedal assembly 100*b* includes a retainer 80*b*. The retainer 80*b* is similar to the retainer 80*a*. The retainer 80*b* has a hook 82*b* which is selectively engaged to the right foot board 36 via a pin 39*b*. The pin 39*b* is similar to the pin 39*a*. The hook 82*b* is similar to the hook 82*a*, but does not have the contact surface 33 of the hook 82*a*, and has a pin 43*b* extending inwardly. The pin 43*b* is disposed rearwardly of the pin 39*b*.

The brake actuator 40*b* is similar to the brake actuator 40*a*, but does not have the pin 43*a*. The pivoting arm 42 is also provided with a flange 47*b*. The flange 47*b* selectively abuts the pin 39*b* of the hook 82*b*, for operating the retainer 80*b* between the first and second states. The brake actuator 40*b* is shown in FIG. 10 in dotted lines for clarity.

The foot board and pedal assembly 100*b* operates in a manner similar to the foot board and pedal assembly 100*a*. When the pedal 41 is moved downwards past the position B, the flange 47*b* abuts the pin 43*b* which forces the hook 82*b* to pivot about the pivot point 81 and to release engagement from the pin 39*b*. When the hook 82*b* is disengaged from the pin 39*b*, the right foot board 36 is free to pivot downwards.

Figure 11:
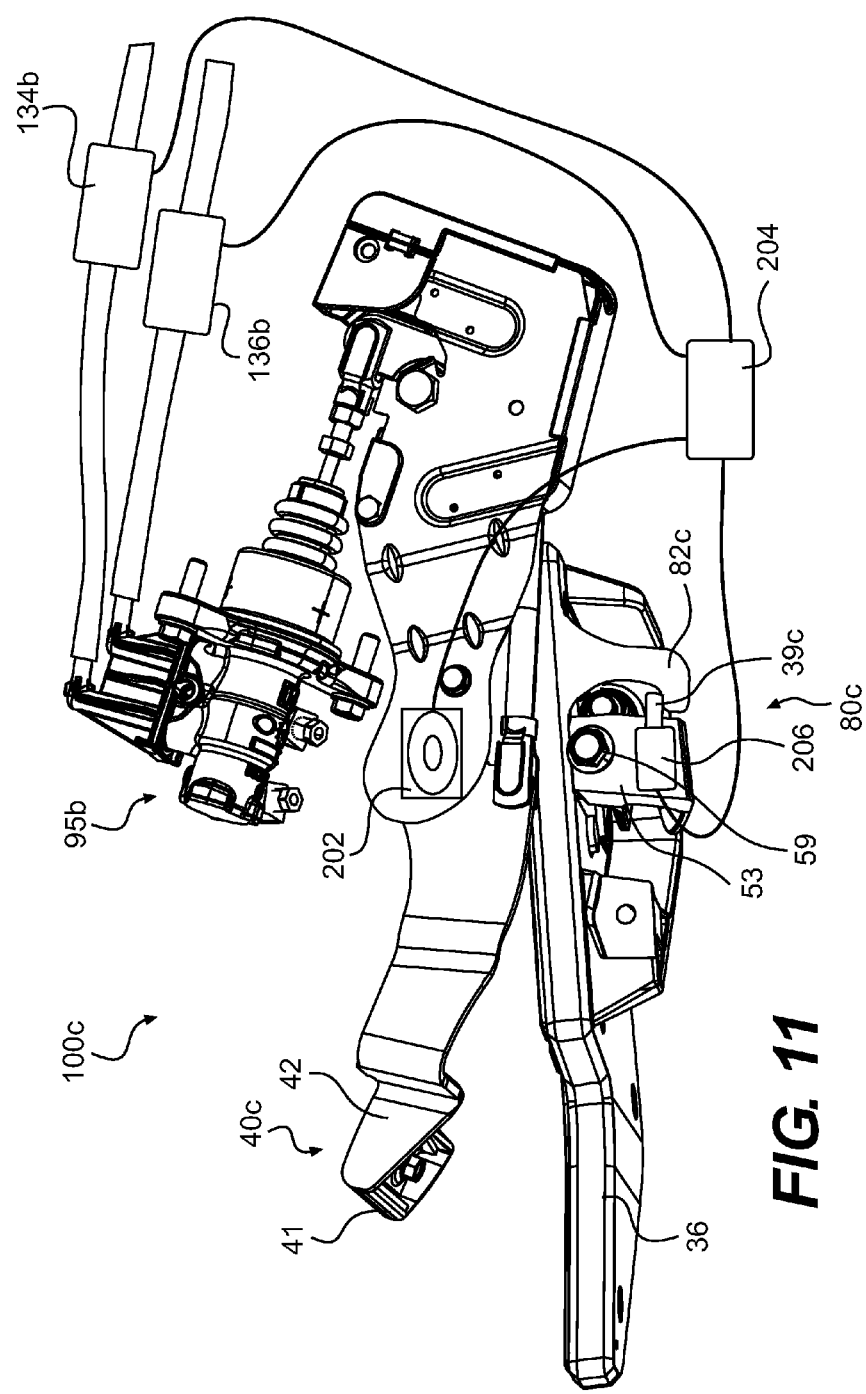
FIG. 11 is a perspective view taken from a front, left side of a third embodiment of a foot board and pedal assembly for the vehicle of FIG. 1.

Turning now to FIG. 11, a third embodiment of a foot board and pedal assembly 100*c* will be described. Elements common to the foot board and pedal assembly 100*a* will be referred to using the same reference numerals, and will not be described herein again in detail. The foot board and pedal assembly 100*c* is in operative connection with the second embodiment of the braking system 95*b*. However, it is contemplated that the foot board and pedal assembly 100*c* could be in operative connection with the first embodiment of the braking system 95*a*, or with other embodiments of the braking system. It is also contemplated that the foot board and pedal assembly 100*c* could be in operative connection with one or more operative systems of the vehicle other than the braking system. For example, the foot board and pedal assembly 100*c* could be in operative connection with a gearing system of the vehicle 10, and in which case the pedal 41 of the foot board and pedal assembly 100*c* would be a gear shifting pedal.

A pedal sensor 202 is disposed on the pivoting arm 42 of a brake actuator 40*c*. The brake actuator 40*c* is similar to the brake actuator 40*a*, but has no pin 43*a*. The pedal sensor 202 senses a position of the pedal 41. It is contemplated that the pedal sensor 202 could be disposed somewhere else on the vehicle 10. The pedal sensor 202 communicates with a controller 204 disposed on the frame 22. The controller 204 is programmed to determine if a position of the pedal 41 is vertically at or above the position B. The controller 204 is also in communication with pressure sensors 134b, 136b. The pressure sensors 134b, 136b sense hydraulic pressure in the braking system 96b to allow the controller 204 to determine if the foot board 36 should be pivoted. It is contemplated that the pressure sensors 134b, 136b could not be connected to the controller 204, and that information from the pressure sensors 134b, 136b could not be used to determine if the right foot board 36 should be moved. It is contemplated that the controller 204 could be the controller 104. It is contemplated that the controller 204 could be programmed to determine if a position of the pedal 41 is above a predetermined position other than the position B. It is contemplated that the controller 204 could be disposed somewhere else on the vehicle 10.

A retainer 80c includes a hook 82c fixedly connected to the right foot board 36, and a movable pin 39c connected to the arm 53. The hook 82c is disposed rearward of the bolts 59. It is contemplated that the pin 39c could be connected to the frame 22. It is contemplated that the hook 82c could be connected to the frame 22 and the pin 39c be connected to the right foot board 36. A solenoid 206 actuates the movable pin 39c to be in and out of engagement with the hook 82c. The solenoid 206 is controlled by the controller 204. It is contemplated that the hook 82c could be movable and the pin 39c could be fixed, or both the hook 82c and the pin 39c could be movable. It is also contemplated that the hook 82c could have a shape different than shown in the Figures. For example, the hook 82c could be a recess in the foot board 36 or in a bracket connected to the foot board 36.

Under normal operating conditions, the retainer 80c is in the first state, the controller 204 controls the solenoid 206 to position the pin 39c so to engage with the hook 82c, and the right foot board 36 is fixed to the frame 22. T.

When the controller 204 detects from the sensor 202 that the pedal 41 has moved below the position B, and that the sensors 134b, 136b indicate a loss of hydraulic pressure beyond a predetermined value, the controller 204 controls the solenoid 206 to move the pin 39c away from the hook 82c. The retainer 80c is in the second state. The predetermined value corresponds to an altered condition of the braking system 95b, as described above. It is contemplated that the predetermined value could be associated with a condition of the vehicle 10 other than an altered condition of the braking system 95b. When the controller 204 detects from the sensor 202 that the pedal 41 has moved below the position B, but the sensors 136b, 134b indicate a loss of hydraulic pressure above the predetermined value, the solenoid 206 keeps the pin 39c engaged with the hook 82c. It is contemplated that the controller 204 could move the pin 39c away from the hook 82c as soon as the pedal 41 has moved below the position B. Once the pin 39c has been moved away from the hook 82c, the right foot board 36 is free to pivot downwards, and so is the pedal 41, in a manner similar to what has been described above.

Figure 12:
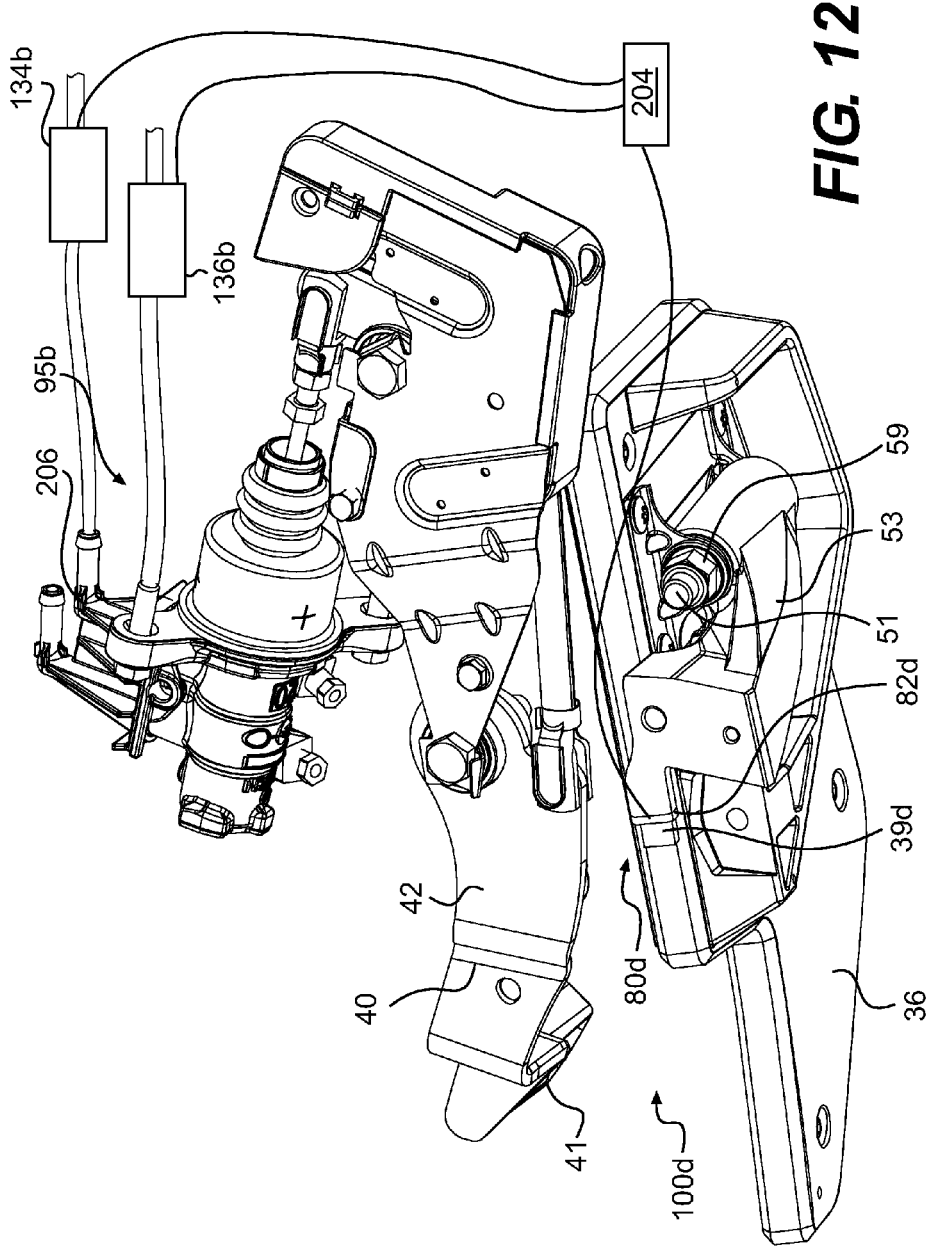
FIG. 12 is a perspective view taken from a front, left side of a fourth embodiment of a foot board and pedal assembly for the vehicle of FIG. 1.

Turning now to FIG. 12, a fourth embodiment of a foot board and pedal assembly 100d will be described. Elements common to the foot board and pedal assembly 100a will be referred to using the same reference numerals, and will not be described herein again in detail. The foot board and pedal assembly 100d is in operative connection with the second embodiment of the braking system 95b. However, it is contemplated that the foot board and pedal assembly 100d could be in operative connection with the first embodiment of the braking system 95a, or with other embodiments of the braking system. It is also contemplated that the foot board and pedal assembly 100d could be in operative connection with one or more operative systems of the vehicle other than the braking system. For example, the foot board and pedal assembly 100d could be in operative connection with a gearing system of the vehicle 10, and in which case the pedal 41 of the foot board and pedal assembly 100d would be a gear shifting pedal.

The foot board and pedal assembly 100d includes the brake actuator 40c described above. The foot board and pedal assembly 100d includes a retainer 80d. The retainer 80d is an electromagnet assembly in operative connected with the controller 204. The retainer 80d includes a first portion 82d and a second portion 39d. The first portion 82d includes a coil of wire creating a magnetic field when current is applied to it. The second portion 39d is one of a permanent magnet and a ferromagnetic material. It is contemplated that the second portion 39d could include a coil of wire, and first portion 82d could be one of a permanent magnet and a ferromagnetic material. The first portion 82d is mounted onto the frame 22 on the arm 53, and the second portion 39d is mounted on the right foot board 36. It is contemplated that the first portion 39d could be mounted elsewhere onto the frame 22. The controller 204 controls the retainer 80d by selectively sending current to the coil of the second portion 39d. When the controller 204 sends current to the coil of the second portion 39d, the retainer 80d is in the first state, the first and second portions 82d, 39d connect each other and the foot board 36 is fixed to the frame 22 in the default position. When no current is sent to the coil of the second portion 39d, the retainer 80d is in the second state, the first and second portions 82d, 39d are disconnected from each other and the foot board 36 is free to pivot downwards with respect to the frame 22.

An operation of the foot board and pedal assembly 100d is similar to the one of the foot board and pedal assembly 100c. Under normal operating conditions, the retainer 80d is in the first state, the controller 204 sends current to the retainer 80d, the first and second portions 82d, 39d contact each other, and the right foot board 36 is fixed to the frame 22.

When the controller 204 detects from the sensor 202 that the pedal 41 has moved below the position B, and that the sensors 134b, 136b indicate a loss of hydraulic pressure beyond a predetermined value, the controller 204 stops sending current to the coil of the second portion 39d, and the first and second portions 82d, 39d are no longer held by magnetic forces. The retainer 80d is in the second state. When the controller 204 detects from the sensor 202 that the pedal 41 has moved below the position B, but the sensors 136b, 134b indicate either no loss or a loss of hydraulic pressure above the predetermined value (or no loss), the controller 204 keeps the retainer 80d in the first state. It is contemplated that the controller 204 could control the retainer 80d to be in the second state as soon as the pedal 41 has moved below the position B without using information from the pressure sensors 136b, 134b. Once the first and second portions 82d, 39d are no longer held by magnetic forces, the right foot board 36 is free to pivot downwards, and so is the pedal 41, in a manner similar to what has been described above.

Figure 13:
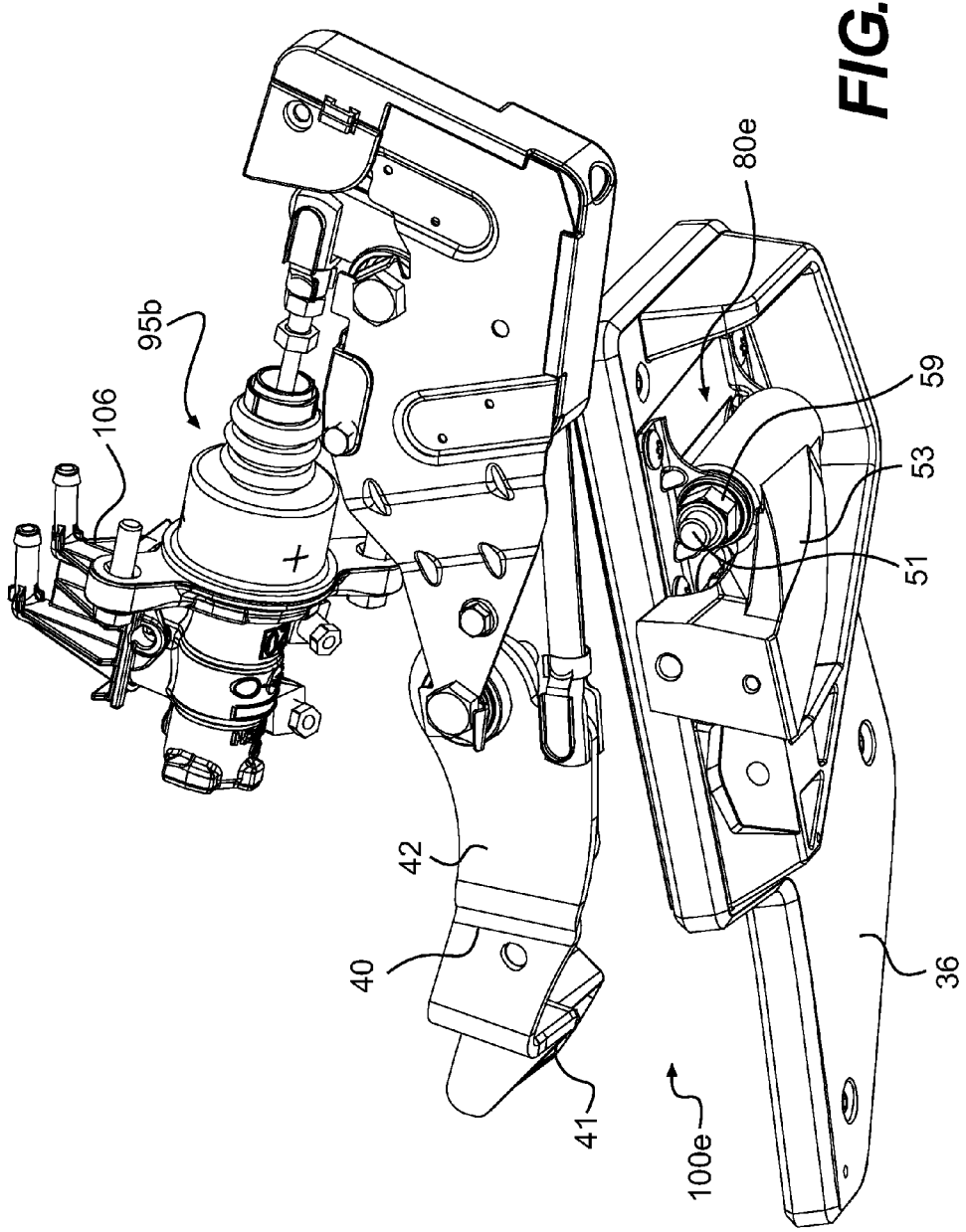
FIG. 13 is a perspective view taken from a front, left side of a fifth embodiment of a foot board and pedal assembly for the vehicle of FIG. 1.

Turning now to FIG. 13, a fifth embodiment of a foot board and pedal assembly 100e will be described. Elements common to the foot board and pedal assembly 100e will be referred to using the same reference numerals, and will not be described herein again in detail. The foot board and pedal assembly 100e is in operative connection with the second embodiment of the braking system 95b. However, it is contemplated that the foot board and pedal assembly 100e could be in operative connection with the first embodiment of the braking system 95a, or with other embodiments of the braking system. It is also contemplated that the foot board and pedal assembly 100e could be in operative connection with one or more operative systems of the vehicle other than the braking system. For example, the foot board and pedal assembly 100e could be in operative connection with a gearing system of the vehicle 10, and in which case the pedal 41 of the foot board and pedal assembly 100e would be a gear shifting pedal.

The foot board and pedal assembly 100e includes the brake actuator 40c described above. The foot board and pedal assembly 100e includes a retainer 80e. The retainer 80e includes a spring (shown in phantom) around the shaft 51, so that the foot board 36 is spring loaded toward the default position. The retainer 80e selectively prevents the foot board 36 from pivoting downwards until the user has applied sufficient force onto the foot board 36 to force it to pivot downwards. It is contemplated that the spring could be disposed somewhere else on the foot board and pedal assembly 100e. For example, the spring could be extending between the arm 53 and a bottom surface of the foot board 36.

An operation of the foot board and pedal assembly 100e will now be described. Under normal operating conditions, the retainer 80e is in the first state, the spring biases the foot board 36 toward the default position. The user rests his/her foot onto the foot board 36. The foot board 36 may move slightly from the default position depending on how much the user presses with his/her foot onto the right foot board 36.

Under altered conditions, the user, as described above, presses on the pedal 41 to a position vertically below the position B of the pedal 41. Because the foot board 36 is spring loaded, the foot board 36 is able to pivot as the user presses on the pedal 41 to the position vertically below the position B. It is contemplated that the retainer 80e could have a spring tensioning motor or an actuator connected to the controller 204, and the controller 304 could send a signal to the motor or actuator to adjust a resistance of the spring depending of the position of the pedal 41. For example, when the pedal 41 is at or above the predetermined position, the motor or actuator would make the spring stiff, and when the pedal 41 is below the predetermined position, the motor or actuator would make the spring soft.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A straddle-type wheeled vehicle comprising:
a frame;
a straddle seat connected to the frame;
at least two wheels operatively connected to the frame;
a steering assembly connected to the frame forwardly of the straddle seat, the steering assembly being operatively connected to at least one of the at least two wheels;
an engine connected to the frame, the engine being operatively connected to at least one of the at least two wheels;
a foot board pivotally connected to the frame;
a retainer connected between the frame and the foot board, the retainer selectively preventing the foot board from pivoting with respect to the frame; and
an actuator movably connected to the frame, the actuator being operatively connected to at least one operative system of the vehicle, the actuator having a pedal disposed at least in part vertically above the foot board,
in a first state of the retainer, the foot board is fixed in a default position with respect to the frame by the retainer, the pedal is movable between a first position and a second position, the second position of the pedal being vertically below the first position of the pedal, the first and second positions of the pedal being vertically above the default position of the foot board,
in a second state of the retainer, the foot board pivots such that at least a front of the foot board is at a position vertically below the default position, the pedal is movable to a third position, the third position of the pedal being vertically below the second position of the pedal,
the retainer changing between the first state and the second state based on the position of the pedal.

2. The straddle-type wheeled vehicle of claim 1, further comprising:
at least one pedal sensor connected to the actuator, the at least one pedal sensor sensing a position of the pedal; and
a controller communicating with the at least one pedal sensor and the retainer,
when the at least one pedal sensor senses that the pedal is vertically at or above a predetermined position, the controller controls the retainer to be in the first state, and
when the at least one pedal sensor senses that the pedal is vertically below the predetermined position, the controller controls the retainer to be in the second state.

3. The straddle-type vehicle of claim 2, wherein the retainer includes an electromagnet assembly having a first portion connected to the foot board and a second portion connected to the frame,
when the at least one pedal sensor senses that the pedal is vertically at or above a predetermined position, the controller sends current to the electromagnet assembly to connect the first and second portions together, and
when the at least one pedal sensor senses that the pedal is vertically below the predetermined position, no current is sent to the electromagnet assembly and the first and second portions are disconnected from each other.

4. The straddle-type wheeled vehicle of claim 2, wherein the predetermined position of the pedal is the second position of the pedal.

5. The straddle-type wheeled vehicle of claim 2, wherein the retainer selectively engages with the foot board to prevent the foot board from pivoting with respect to the frame.

6. The straddle-type wheeled vehicle of claim 2, wherein the at least one operative system of the vehicle is a braking system operatively to at least one of the at least two wheels for braking the vehicle;
the actuator is a braking actuator;
the pedal is a brake pedal; and
the controller only controls the retainer to be in the second state when the braking system experiences a loss of hydraulic pressure below a predetermined value, thereby permitting the brake pedal to move vertically below the predetermined position.

7. The straddle-type wheeled vehicle of claim 6, further comprising at least one pressure sensor of the braking system,
the controller being in connection with the at least one pressure sensor,
the controller controlling the retainer to be in the second state when the controller has determined that the braking system has experienced the loss of hydraulic pressure below the predetermined value based on information received from the at least one pressure sensor.

8. The straddle-type wheeled vehicle of claim 1, wherein the at least one operative system of the vehicle is a braking system operatively connected to at least one of the at least two wheels for braking the vehicle;

the actuator is a braking actuator; and the pedal is a brake pedal.

9. The straddle-type wheeled vehicle of claim 1, wherein the retainer is movably connected to the frame;

in the first state of the retainer, the retainer engages the foot board; and in the second state of the retainer, the retainer disengages from the foot board.

10. The straddle-type wheeled vehicle of claim 9, wherein the retainer moves between the first and second states based on a position of the pedal.

11. The straddle-type wheeled vehicle of claim 10, wherein the pedal selectively engages the retainer to move the retainer between the first and second states.

12. The straddle-type wheeled vehicle of claim 9, wherein when the pedal is moved between the first and second positions, the pedal is spaced from the retainer.

13. The straddle-type wheeled vehicle of claim 9, wherein the retainer is spring loaded and biased toward a position for engaging the foot board.

14. The straddle-type wheeled vehicle of claim 1, wherein the pedal is disposed at least in part laterally between the foot board and the frame.

15. A straddle-type wheeled vehicle comprising:

a frame;

a straddle seat connected to the frame;

at least two wheels operatively connected to the frame;

a steering assembly connected to the frame forwardly of the straddle seat, the steering assembly being operatively connected to at least one of the at least two wheels;

an engine connected to the frame, the engine being operatively connected to at least one of the at least two wheels;

a foot board pivotally connected to the frame;

a retainer connected between the frame and the foot board, the retainer being movably connected to the frame, the retainer selectively preventing the foot board from pivoting with respect to the frame; and an actuator movably connected to the frame, the actuator being operatively connected to at least one operative system of the vehicle, the actuator having a pedal disposed at least in part vertically above the foot board, in a first state of the retainer, the retainer engages the foot board, the foot board is fixed in a default position with respect to the frame by the retainer, the pedal is movable between a first position and a second position, the second position of the pedal being vertically below the first position of the pedal, the first and second positions of the pedal being vertically above the default position of the foot board, in a second state of the retainer, the retainer disengages from the foot board, the foot board pivots such that at least a front of the foot board is at a position vertically below the default position, the pedal is movable to a third position, the third position of the pedal being vertically below the second position of the pedal.

16. The straddle-type wheeled vehicle of claim 15, wherein the retainer moves between the first and second states based on a position of the pedal.

17. The straddle-type wheeled vehicle of claim 16, wherein the pedal selectively engages the retainer to move the retainer between the first and second states.

18. The straddle-type wheeled vehicle of claim 15, wherein the at least one operative system of the vehicle is a braking system operatively connected to at least one of the at least two wheels for braking the vehicle;

the actuator is a braking actuator; and the pedal is a brake pedal.

19. The straddle-type wheeled vehicle of claim 18, wherein upon a loss in hydraulic pressure in the braking system, the pedal is movable vertically below the second position, and moving the pedal to a position vertically below the second position causes the retainer to be in the second state thereby disengaging the retainer from the foot board to permit the pedal to move to the third position.

20. The straddle-type wheeled vehicle of claim 15, wherein the retainer is spring loaded and biased toward a position for engaging the foot board.

* * * * *